July 11, 1972 H. MOLLY 3,676,027
CRESENT MACHINE

Filed March 11, 1971 3 Sheets-Sheet 1

INVENTOR
HANS MOLLY
BY
Darbo, Robertson &
Vandenburgh

July 11, 1972  H. MOLLY  3,676,027
CRESENT MACHINE
Filed March 11, 1971  3 Sheets-Sheet 2

INVENTOR
HANS MOLLY
BY
Darbo, Robertson &
Vandenburgh

July 11, 1972  H. MOLLY  3,676,027
CRESENT MACHINE
Filed March 11, 1971  3 Sheets-Sheet 3

INVENTOR
HANS MOLLY
BY
Darbo, Robertson &
Vandenburgh

United States Patent Office 3,676,027
Patented July 11, 1972

3,676,027
CRESCENT MACHINE
Hans Molly, 48 Dr. Eugen-Essig-Str.,
7502 Malsch, Germany
Filed Mar. 11, 1971, Ser. No. 116,728
Claims priority, application Germany, Mar. 14, 1970,
P 20 12 149.7; Jan. 7, 1971, P 21 00 435.3
Int. Cl. F01c *1/10;* F03c *3/00;* F04c *1/06*
U.S. Cl. 418—71                 7 Claims

ABSTRACT OF THE DISCLOSURE

A hydraulic pump or motor has a spur gear which engages an internal ring gear and a crescent between one side of the two gears. The machine casing has a cavity substantially larger than the ring gear. Two rocker shoes are between the casing wall and the ring gear on opposite sides of the ring gear. These shoes support the ring gear while permitting it to move along a line connecting the centers of the two gears.

BACKGROUND AND SUMMARY OF THE INVENTION

The parent patent, U. S. No. 3,512,906, issued May 19, 1970, relates to a gearwheel machine (fluid pump or motor) having two gear wheels having heads which bear against a machine casing to bound a relatively small suction chamber and a pressure chamber extending relatively widely around the gearwheels, in such a way that the resulting oil pressure force, on each of the gearwheels each contain a component in the direction of the other gearwheel. The basic idea of the parent patent is that one gearwheel is guided with provision for movement substantially in the direction of the line connecting the gearwheel centers and is supported perpendicularly to such connecting line. The high pressure then forces that gearwheel against the other gearwheel, on which the high pressure also exerts forces. The components of such forces operative in the direction of the line connecting the gearwheel centers then cancel one another out and become inoperative as forces applied to the bearings. The only supporting forces which must be provided are then forces perpendicular to the line connecting the gearwheel centers which absorb the components of force not canceling one another out. The result is that the bearing forces can be substantialy reduced and the life of the pump at such high pressures lengthened.

One preferred embodiment of the parent patent is a gearwheel machine which is constructed in the form of a crescent machine having a spur gear engaging with an internal ring gear of larger diameter and in which: the ring gear is guided with provision for limited movement in the machine casing in the direction of the line connecting the gearwheel centers; the spur gear is mounted in the machine casing; a crescent member rigidly connected to the casing is disposed between the spur gear and the ring gear; and the space between the ring gear and the casing is connected to the high pressure zone of the machine, and the suction connection so discharges in a zone limited by and formed between the crescent member, the ring gear and the spur gear that the forces exerted by the high pressure on the ring gear and the spur gear form an obtuse angle with one another and partially counteract one another via the teeth of the two gearwheels. To support the ring gear, which would otherwise run in the high pressure zone, a negative pressure area engages with the ring gear's periphery, substantially perpendicular to the line connecting the gearwheel centers. This negative pressure area at the same time also counteracts any deformation of the ring gear by the high oil pressure forces.

In the embodiment disclosed in the parent patent the ring gear is guided in the machine casing by the inside wall of the machine casing which is curved, with respect to the outer radius of the ring gear about two centers offset in relation to each other along the line connecting the gearwheel centers. Guiding the ring gear in this way ensures that the pump operates satisfactorily, but causes certain manufacturing difficulties, since the inside of the casing must have a cross-section taking the shape of two closely adjacent circles which intersect one another with a gradual transition.

It is an object of the invention to provide a construction which enables operations to be performed with a casing interior of genuinely circular cross-section, while at the same time ensures that the ring gear can move along the line connecting the gearwheel centers.

To this end, the inside diameter of the casing interior, according to the invention, is substantially larger than the outside diameter of the ring gear, and in the resulting annular space between the ring gear and the casing wall rocker-shaped bearing members or shoes are disposed opposite one another and each contact the ring gear by cylindrical bearing surfaces and the outer surface of each bears against the casing wall via a contour allowing a rolling motion. In this way the bearing members can perform an oscillatory movement and the center of the ring gear can move in relation to the spur gear on the line connecting the gearwheel centers.

The method according to the invention for supporting the ring gear and preventing it from being deformed by the hydraulic pressure forces is that pressure and suction areas are limited on the bearing surfaces and connected via bores having further pressure and suction areas which are smaller, are limited by resilient sealing means between the outsides of the bearing members and the casing inner wall, and are connected, one to the pressure side and one to the suction side of the machine.

At high pressures the ring gear may be deformed by the hydraulic forces. In view of such deformation the pressure and suction areas can advantageously be somewhat differently arranged. An arrangement of the pressure and suction areas which counteracts this deformation is produced by the feature that the pressure and suction areas limited on the bearing surfaces are offset in relation to the ring gear diameter perpendicular to the connecting line of the centers of a spur gear and ring gear, in the direction of the place of engagement of the spur gear and ring gear.

For kinematic reasons it is advantageous if even with such offsetting of the pressure and suction areas in the zone of the ring gear diameter the bearing members are kinematically supported, offset in relation to the centers of gravity of the pressure and suction fields, on the casing wall.

Advantageously the contour of the bearing members, which each extend over the zones of the pressure and suction areas, is asymmetrical, so that the kinematic support on the casing wall takes place in the zone of the edges of the bearing members.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Figure 1:
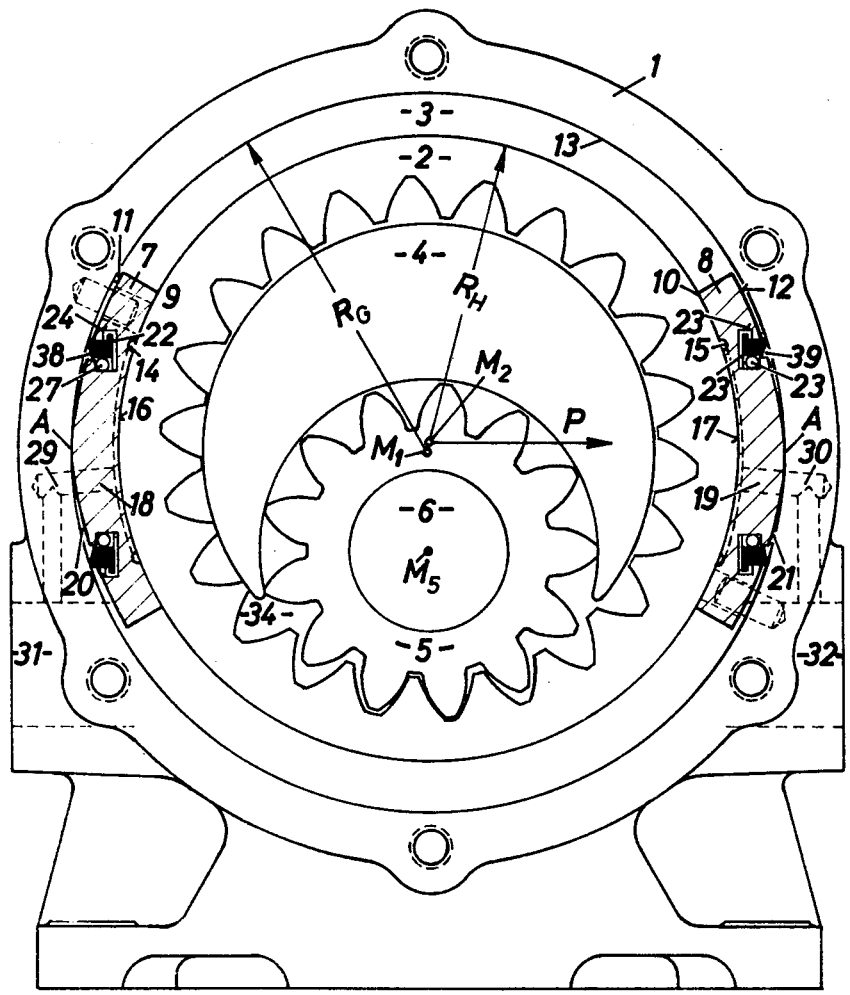
FIG. 1 is a cross-section through a crescent type gearwheel machine according to the invention.
Figure 2:
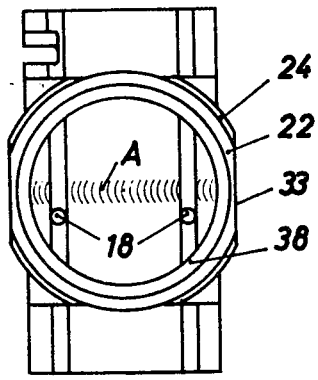
FIG. 2 is a view of the outside of a bearing member used in the machine of FIG. 1.
Figure 3:
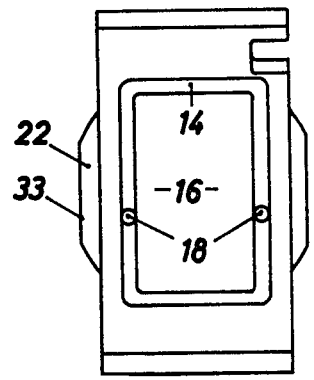
FIG. 3 is a view of the inside of the bearing member.

In the embodiment illustrated in FIG. 1 a casing 1 has an internal cavity formed about a radius $R_G$ substantially larger than outer radius $R_H$ of an internal ring gear 2. An annular space 3 therefore exists between the wall 13 of casing 1 and the periphery of ring gear 2. The casing 1 has a crescent member 4 secured thereto. A spur gear 5 having a shaft 6 is also mounted in the casing 1. The crescent member 4 substantially fills the space between the ring gear 2 and the spur gear 5. The center of the ring gear 2 has the reference $M_2$. The center of the spur gear 5 has the reference $M_5$, and the center of the casing 1 the reference $M_1$.

Two rocker-shaped bearing members or shoes 7, 8 are disposed opposite one another in the annular space 3 between the casing 1 and the ring gear 2. The two bearing members have semi-cylindrical bearing surfaces 9, 10 contacting the periphery of the ring gear 2. On their outsides the bearing members 7, 8 have a contour which corresponds to the casing radius $R_G$ only over a narrow central zone A, while over the reset of the zone the contour is withdrawn inwardly at places 11, 12 to such an extent that the bearing members 7, 8 can perform, with the contours 11, 12, a rolling movement on the cylindrical inner wall 13 of the casing 1. This enables the bearing members 7, 8 to make an oscillatory movement, and the ring gear 2 guided between the bearing members can move on the line connecting the gearwheel centers $M_2$–$M_5$.

On the inner surfaces 9, 10 of the bearing members 7, 8 suction or pressure areas 16, 17 are limited by grooves 14 positioned in a rectangle. The grooves are connected via passages 18, 19 to corresponding suction and pressure areas 20, 21 which are limited by resilient sealing members on the outside of the bearing members 7, 8. The sealing members comprise rings 22, 23 positioned in grooves 24, 25 on the outside of the bearing members 7, 8 and are turned over cylindrically on their sides contacting the casing. O-sealing rings 27, 28 on the inside of the rings 22, 23 provide a seal between the rings 22, 23 and the bearing members 7, 8. A pressure or suction area is therefore limited, the sealing members allowing the bearing members 7, 8 to make an oscillatory rocking movement. The suction and pressure areas 20, 21 are connected via casing bores 29, 30 to the suction connection 31 and pressure connection 32 of the machine.

Flattened portions 33 of the ring 22 prevent the cylindrically turned-over ring from being inserted in the wrong position in the casing. To give the rings 22, 23 the necessary adhesion to the inner wall 13 of the casing 1 their bearing places have bevellings which bring into operation an enlarged area of adhesion on the associated unpressurized side.

OPERATION

The gearwheels run at high pressure, with the exception of a relatively small low pressure zone 34 which is formed between spur gear 5, the ring gear 2 and the crescent member 4 and is connected to the suction or low pressure connection 31. As a result of the high pressure, the ring gear 2 is forced against the spur gear 5, while the pressure operative above the spur gear (FIG. 1) exerts a downwardly directed hydraulic force on the spur gear 5. These forces act on each other via the teeth of the spur gear and ring gear and partially cancel one another out. As shown in FIG. 1, as a result of the hydraulic forces the center $M_2$ of the ring gear has been displaced upwards in relation to the casing center; this was made possible by rocking movement of the bearing members 7, 8. The remaining component of force perpendicular to the line connecting the gearwheel centers $M_2$–$M_5$ is absorbed by the suction area and by the bearing member 8 via its narrow central zone A. As in the parent patent, the suction area 16 is somewhat larger than required by the force P operative perpendicular to the center line, while the suction area 20 on the outside of the bearing member 7 can absorb only between 85 and 95% of the force P. During operation, the ring gear will then be supported in the direction of the force P on the bearing member 8 disposed on the pressure side, and relieved of up to 15% or 5% of the force P by the bearing member on the suction side and having the suction area 16. Due to the dimensions of the suction area 16, the suction-side bearing member 7 nestles against the ring gear 2 and is readily lifted from the narrow bearing area A, due to the lower force of the suction area 20.

Figure 5:
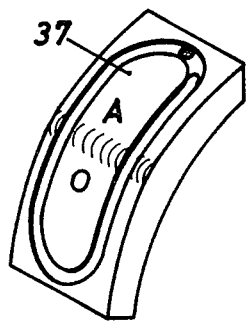
FIG. 5 shows a second variant.
Figure 4:
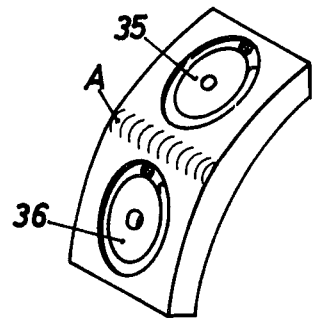
FIG. 4 is an isometric view of a variant construction of the bearing member.

As a result of this effect, the connecting forces occurring in the ring gear are removed by suction and therefore the bearing of the ring gear 2 against the crescent member 4 is substantially relieved from wearing forces. A suction area of adequate size can be accommodated by the formation of the annular suction area 20, extending as far as the edge of the bearing member 7 which has the same width as the ring gear 2. In the case of extremely narrow pumps, operations can be performed with two areas 35, 36 of the kind specified (FIG. 4), or the suction area need not be circular in shape, as shown at 37 in FIG. 5.

The invention produces a very simple construction, since the machining of the casing and the bearing of the ring gear are based exclusively on concentric circles, so that no difficult operations endanger the precision of the system.

Figure 6:
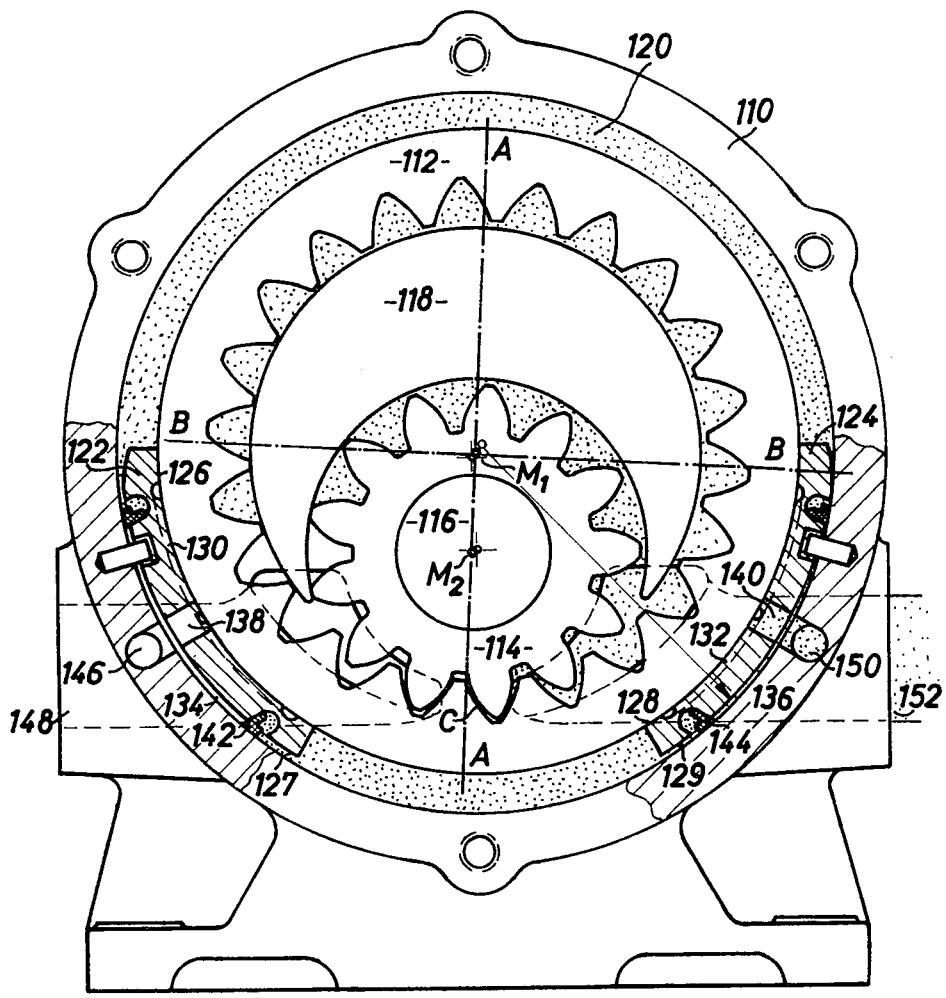
FIG. 6 is a section through an alternative embodiment of the invention.
Figure 7:
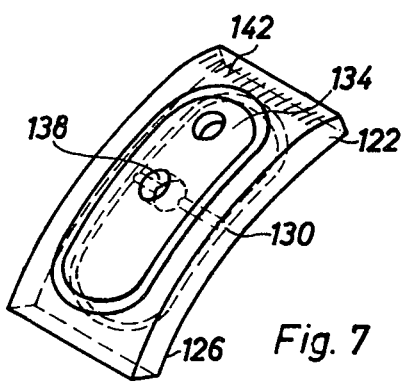
FIG. 7 is an isometric view of a bearing member used for the embodiment shown in FIG. 6.

In the embodiment illustrated in FIGS. 6 and 7, an internal ring gear 112 is disposed in a machine casing 110. The ring gear 112 engages with a spur gear 114 on a shaft 116. The space formed between the spur gear 114 and the ring gear 112 is filled by a crescent member 118 rigidly connected to the casing.

The inside diameter of the casing 110 is substantially larger than the outside diameter of the ring gear 112, so that an annular space 120 formed between the inner wall of the casing and the ring gear 112.

The center of the ring gear as the reference $M_1$ and the center of the spur gear has the reference $M_2$. A connecting line A—A passes through the centers $M_1$ and $M_2$. The ring gear diameter extending perpendicularly to the line A—A has the reference B—B. The ring gear 112 is guided in the casing 110 by two rocker-shaped bearing members 122, 124 having semi-cylindrical inner surfaces 126, 128 conforming to the periphery of the ring gear 112. On their outsides they have a contour allowing a rocking or rolling movement. In contrast to the embodiment of FIG. 1, the rocker-shaped bearing members are not positioned symmetrical about the ring gear diameter B—B, but are offset in the direction of the position C at which the gearwheels engage. The contour is such that the pivoting movement nevertheless still takes place around a point in the zone of the ring gear diameter B—B, thus ensuring accurate vertical guidance of the ring gear 112 in the casing 110.

Pressure and suction areas 130, 132 are defined on the bearing surfaces 126, 128 of the bearing members 122, 124.

The pressure and suction areas 130, 132 are connected via bores 138, 140 to pressure and suction areas 134, 136 on the outsides of the bearing members 122, 124. The areas 134, 136 are limited by pressure-tight resilient sealing members 142, 144 between the outer surfaces 127, 129 of the bearing members 122, 124 and the inside wall of the casing 110. The size of the areas 134, 136 is smaller than that of the areas 130, 132. The area 134 is connected via a passage 146 to a connection 148, while the area 136 is connected via a passage 150 to a connection 152.

In dependence on the direction of rotation of the machine, and whether it is operated as a motor or a pump, the connection 148 is, for instance, the suction connection, the connection 152 being the pressure connection. In that case, a suction area 130 is produced in the inside of the casing, which is otherwise substantially filled by the high pressure, as shown by dots. Since this low pressure is guided to the area 130, the bearing member 122 applies suction to the ring gear. The area 134 exercises a suctional force on the bearing member 122, tending to pull it against the casing wall.

Since the area 134 is smaller than the area 130, the bearing members are reliably prevented from being torn off the ring gear. These suctional forces at the places shown counteract any deformation of the ring gear 112 by the hydraulic forces operative thereon, so that the ring gear 112 maintains its shape and the gearwheel machine operates reliably even at maximum pressures.

I claim:

1. In a gearwheel machine of the type comprising a casing having walls defining an internal cavity, a relatively large internal ring gear rotatably positioned in the cavity, a relatively small spur gear rotatably positioned in the cavity and engaging the ring gear at a position, a crescent between the two gears, the ring gear being movable along a line connecting the centers of the two gears, a high pressure conduit, and a low pressure conduit, the improvement comprising:

the wall of the casing about the periphery of the ring gear being substantially larger than the periphery of the ring gear so that there is substantial space between the periphery of the ring gear and that wall; a first rocker member in said space at one side of said line; a second rocker member in said space at the other side of said line; said rocker members each having a semi-cylindrical inner face in contact with the periphery of the ring gear and having an external rocker face in contact with the casing wall.

2. In a machine as set forth in claim 1, wherein said members have annular resilient means between the external faces thereof and the wall of the casing to define pressure areas, and have means at the internal faces thereof to define pressure areas adjacent the periphery of the ring gear, and passageway means connecting the pressure areas of one member with the high pressure conduit and connecting the pressure areas of the other member with the low pressure conduit.

3. In a machine as set forth in claim 2, wherein the members have grooves on the external faces, said resilient means for each member being a first ring turned over cylindrically on the side contacting the casing, and including an O-sealing ring for each member disposed on the inside of the first ring to provide a seal between the first ring and the member.

4. In a machine as set forth in claim 2, wherein said areas on the members are offset, in relation to a ring gear diameter perpendicular to said line, in the direction of the position of engagement of the gears.

5. In a machine as set forth in claim 4, wherein in the zone of said diameter said members are kinematically supported, offset in relation to the centers of gravity of the pressure and suction fields, on the casing wall.

6. In a machine as set forth in claim 5, wherein the contour of the bearing members, which extend over said areas on the inner face, is asymmetrical so that kinematic support on the casing wall takes place in the zone of the edges of the bearing members.

7. In a machine as set forth in claim 1, wherein said members are offset, in relation to a ring gear diameter perpendicular to said line, in the direction of the position of engagement of the gears.

References Cited

UNITED STATES PATENTS

| | | | |
|---|---|---|---|
| 1,719,639 | 7/1929 | Wilsey | 418—169 |
| 3,512,906 | 5/1970 | Molly | 418—170 |
| 3,525,580 | 8/1970 | Eckerle | 418—169 |
| 3,602,616 | 8/1971 | Jung | 418—170 |

FOREIGN PATENTS

| | | | |
|---|---|---|---|
| 744,323 | 1/1933 | France | 418—108 |

CARLTON R. CROYLE, Primary Examiner

J. J. VRABLIK, Assistant Examiner

U.S. Cl. X.R.

418—170